United States Patent [19]

Mueller, Jr.

[11] 4,161,189
[45] Jul. 17, 1979

[54] CONTROL VALVE

[75] Inventor: Otto Mueller, Jr., Detroit, Mich.

[73] Assignee: Massey-Ferguson Inc., Detroit, Mich.

[21] Appl. No.: 835,252

[22] Filed: Sep. 21, 1977

Related U.S. Application Data

[63] Continuation of Ser. No. 714,419, Sep. 16, 1976, abandoned.

[51] Int. Cl.² ............................................ F16K 15/06
[52] U.S. Cl. .................................. 137/514.7; 137/538
[58] Field of Search .............. 137/514.3, 514.5, 514.7, 137/538

[56] References Cited

U.S. PATENT DOCUMENTS

| 1,322,938 | 11/1919 | Parker | 137/514.7 |
|---|---|---|---|
| 1,754,975 | 4/1930 | Anderson | 137/514.5 |
| 2,318,962 | 5/1943 | Parker | 137/514.5 |
| 2,323,021 | 6/1943 | Ernst | 137/514.5 |
| 2,917,077 | 12/1959 | Ziege | 137/514.7 |
| 3,103,230 | 9/1963 | Kutsche | 137/514.5 X |
| 3,202,177 | 8/1965 | Klein | 137/514.7 |
| 3,605,802 | 9/1971 | Hertell | 137/514.5 |
| 3,867,289 | 2/1975 | Ortega | 137/514.5 |

*Primary Examiner*—Robert G. Nilson
*Attorney, Agent, or Firm*—John C. Thompson

[57] ABSTRACT

A pressure control valve having improved damping means which permits the valve to have a high degree of response combined with improved stability. The valve includes a valve spool mounted within a valve body and shiftable against spring pressure from a normal position to a nominal design operating position wherein discharge ports in the valve body are placed in communication with the inlet port. First damping means are provided which become operational only as the control member attains the nominal design operating position, the first damping means including an orifice in the valve body and a ring carried by the valve spool, the ring overlying the orifice when the valve spool attains its nominal design operating position. Second damping means apply unidirectional damping acting during departure of the control member from its design operating point, the second damping means including the aforesaid ring and a cylindrical wall of the valve body, the ring and the cylindrical wall defining an annular damping orifice.

4 Claims, 3 Drawing Figures

CONTROL VALVE

CROSS REFERENCE TO RELATED APPLICATION

This application is a continuation of U.S. application Ser. No. 714,419 filed Aug. 16, 1976, now abandoned.

This invention relates to control valves and more particularly to a pressure control valve having improved damping means which provide improved performance characteristics.

Control valves of the pressure control type are actuated in response to a predetermined increase of hydraulic pressure to regulate and maintain the system pressure at a desired level. Such valves generally include a spool or control member variably positioned by a hydraulic actuating pressure to control and direct fluid flow to a low pressure outlet. Spring biasing means are usually provided to act against the control member in opposition to the pressure forces so that the control member is positioned by the balance between the force applied by the hydraulic pressure and the opposing force of the spring biasing means. Improper movement of the control member, i.e. movement which is too slow or too fast in response to the hydraulically applied pressure to the control member, may result in undesirable oscillation, noise, chatter, excessive flow and generally unacceptable performance.

The prior art has recognized that it is desirable to damp the movement of the control member, and commercially available damping constructions customarily employ a fixed orifice. If the fixed orifice is designed to permit a high degree of response, the control member may overshoot the intended operating position. This results in instability of the control member. Alternatively, if the orifice is so designed to prevent undue overshoot, the control member may not be sufficiently responsive.

Accordingly, it is the principal object of this invention to provide a pressure control valve having a high degree of response combined with improved stability.

In accordance with a preferred embodiment of the invention, there is provided a pressure control valve having a valve body with a spool moveable therein by the force of hydraulic pressure applied at one of its ends and which is opposed by the force of spring biasing means applied at its opposite end. The housing is mounted within the sump of a vehicle and includes low pressure outlets. The opposite end of the spool carries a ring member which traverses a chamber having fluid at atmospheric pressure, the ring passing over an orifice when the control member attains its nominal design operating position to partially block the flow of fluid therethrough and thereby to apply greatly increased damping forces to the spool when the ring member is in partial blocking engagement with the orifice. In addition, the peripheral surface of the ring cooperates with the surface of the chamber to define an annular orifice which applies reduced damping as the control member is moved away from the nominal design operating position.

The various features and details of the construction and operation of the valve in accordance with the present invention are hereinafter more fully set forth with reference to the accompanying drawing wherein a preferred form of the invention is illustrated.

Figure 1:
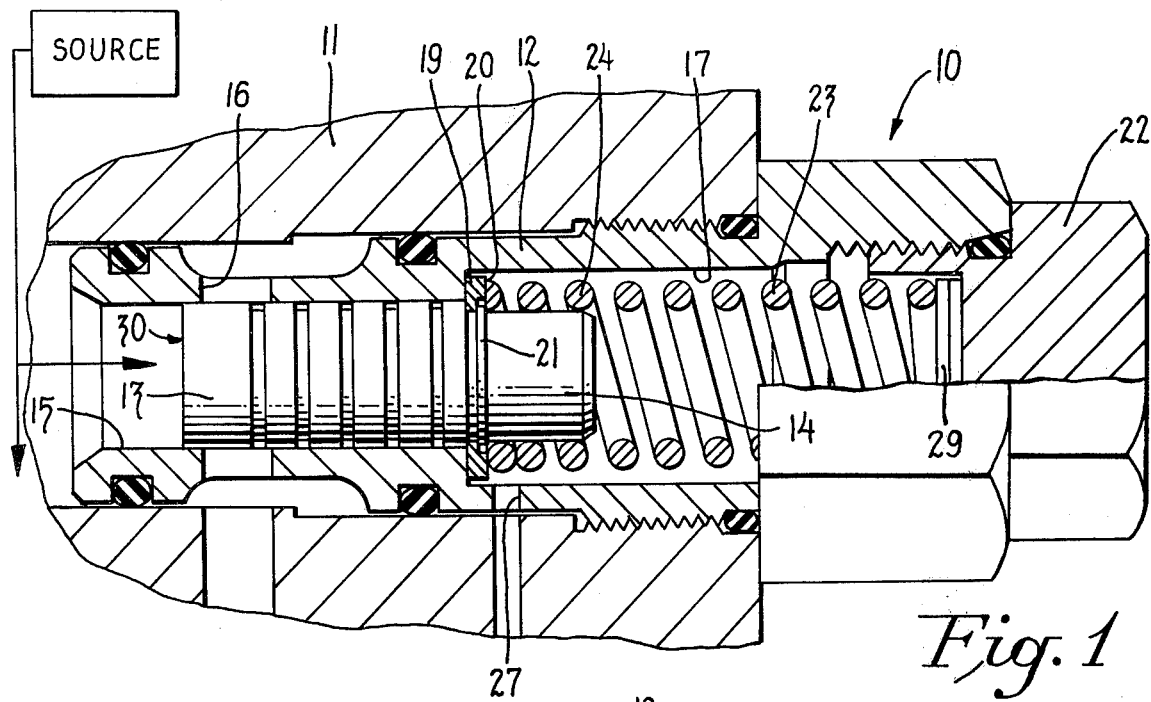
FIG. 1 is a longitudinal section of a pressure control valve constructed in accordance with the principles of the present invention, the valve spool being shown in its normally closed position.

Referring now to the drawings there is shown a valve 10 capable of regulating the pressure of a system to a predetermined value and which is mounted within a suitable housing 11 of a vehicle. The valve includes a body 12, and a control member or spool 13 mounted for reciprocal movement in a first bore 15 constituting the inlet passage of the valve. Openings 16 are disposed in opposite walls of the valve body to serve as low pressure outlets. The spool includes an end portion 14 of reduced diameter which travels in a second enlarged bore 17, constituting a damping chamber. An enlarged portion in the form of a ring 19 is disposed on the end portion of the spool and is held against a shoulder 18 by retaining means 21 to prevent relative axial motion. The enlarged portion may, however, be an integral part of the spool itself. The housing 12 includes a plug assembly 22 threaded into the end of the damping chamber 17, and biasing means in the form of a helical compression coil spring which extends between the plug assembly and the spool 13 to urge the spool to the normally closed position shown in FIG. 1. Spool end 24 of the spring 23 is shown piloted or guided on the end portion 14 and abuts face 20 of ring 19. The spring force may be adjusted by one or more shims 29 added in the recess of plug 22 to establish the required operating force on spool 13.

When the spool is in the closed position, shown in FIG. 1, the openings 16 are covered by the forward end of spool 13. The enlarged damping chamber 17 at the other end of the housing is normally filled with hydraulic fluid and communicates via a restrictive orifice 27 with an external reservoir at atmospheric pressure. Upon an increase in fluid pressure against the face 30, corresponding to the predetermined design operating pressure of the valve, the force applied to face 30 of the spool overcomes the bias of spring 23 and causes the spool to assume an equilibrium or nominal design operating position illustrated in FIG. 2. In this position the forward end face 30 of spool 13 will have exposed sufficient discharge or metering area in outlet openings 16 to maintain such position. In this position the ring 19 partially covers the orifice 27 and outflow from chamber 17 is further impaired and an increased resistance or damping force is generated. Thus, the peripheral surface of the ring 19 cooperates with the surface of the chamber immediately adjacent the orifice 27 to form first damping means which becomes operational only as the control member attains its nominal design operating position, the first damping means greatly damping the movement of the control member.

Figure 2:
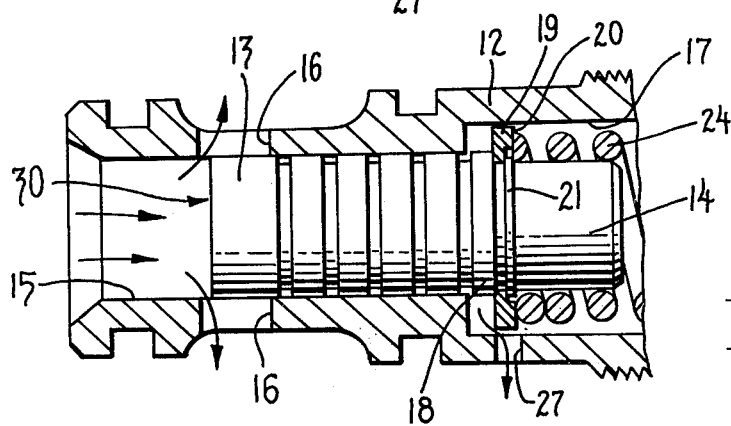
FIGS. 2 and 3 are partial sectional views corresponding to FIG. 1 showing the valve spool in partially open and full open positions, respectively.
Figure 3:
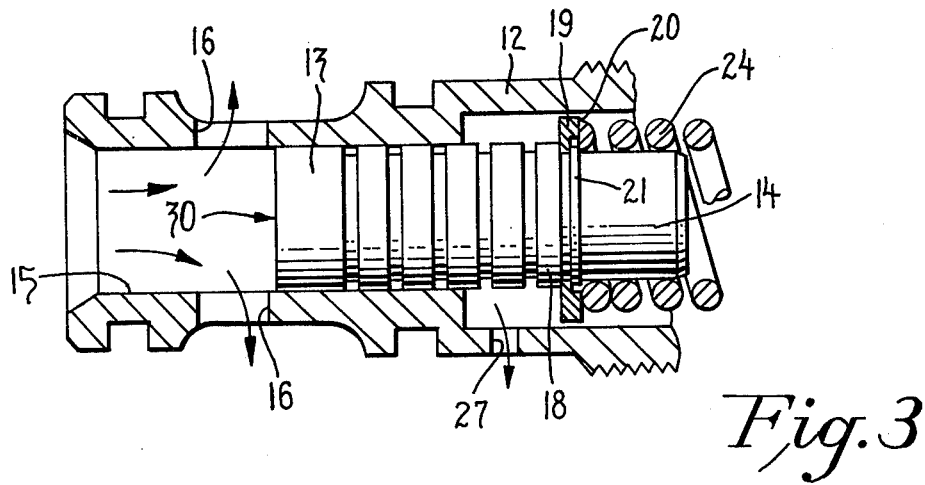

As the control member 13 is moved between its FIG. 1 and FIG. 3 positions additional damping will take place. For example, when moved from the FIG. 2 position to the FIG. 3 position the fluid contained in the valve cavity 17 on the right hand side of ring 19 is displaced to the left hand side thereof through the annular orifice defined by the peripheral surface of the ring cooperating with the surface of the chamber. The annular orifice acts as second damping means and moderately damps the movement of the control member as it moves away from the nominal design operating position.

The second damping means may also damp the control member as it is moved towards the nominal design operating position shown in FIG. 2.

As the control member is moved from the FIG. 1 position to the FIG. 2 position fluid will be displaced from the bore 17 through the restrictive orifice 27, which, by itself, can be considered to be a third damping means. In addition, as the ring 19 moves away from the first bore fluid will flow through the annular orifice defined by the periphery of the ring and the bore 17 to fill the cavity between the ring and the first bore. If the spool is moved at a relatively slow speed fluid will be displaced through the annular orifice or second damping means to effectively damp the movement of the spool. However, if the spool is moved at a very fast rate it is possible for a vacuum to appear in the cavity between the ring and the first bore. In this situation the restrictive orifice 27 acts as the damping means.

Any departure from the equilibrium state shown in FIG. 2 will cause the spool 13 to move either towards the normally closed position (FIG. 1) or the full open position (FIG. 3). This motion requires displacement of fluid from one end of the bore 17 through the annular area between ring and housing bore to moderately damp the movement of the control member. The degree of damping obtained by this action is essentially constant, i.e. depends only on the spool velocity. However, as the ring approaches the position shown in FIG. 2 the damping may be less than the damping as the ring departs from the FIG. 2 position, particularly at high spool velocities. Furthermore, as the ring partially covers the radial orifice 27, outflow from chamber 17 is further impaired and additional resistance or damping force is generated. Thus the axial location of this radial orifice 27 has been chosen to coincide with that of the ring 19 when the spool 13 is at the nominal design operating position. It has been shown that maximum damping is achieved when the ring overlies the orifice 27, FIG. 2, which implies that approach to this spool position from any other location occurs rapidly, i.e. with less damping.

By employing the various damping means set forth above the valve spool 13 will move responsively until it attains its nominal design operating position shown in FIG. 2, the spool being greatly damped at the design point where the spool exposes sufficient discharge area on the outlet holes to maintain the intended regulated pressure of the valve. The above described invention may be similarly utilized in other types of pressure actuated, spring biased valves, and accordingly the foregoing specification is to be considered exemplary in nature and not limiting the scope and spirit of the invention as set out in the following claims:

I claim:

1. A pressure control valve comprising in combination:

a valve body having an inlet and outlet, a chamber having first and second end portions filled with hydraulic fluid, the valve body being further provided with passageway means one end of which is in communication with the chamber intermediate end portions thereof, the passageway means permitting hydraulic fluid to flow into and out of the chamber;

a valve spool mounted within the valve body and shiftable against biasing means into the chamber from a normal closed position through a nominal design operating position to a full open position, the inlet being placed in communication with the outlet as the control member attains the nominal design operating position, the valve spool being provided with an enlarged portion;

first fluid flow restriction means to greatly damp the movement of the valve spool, the restriction means becoming operational only as the valve spool attains the nominal design operating position, the first fluid flow restriction means being formed by the cooperation of the peripheral surface of the enlarged portion of the valve spool and the surface of the chamber immediately adjacent the passageway means.

2. The pressure control valve set forth in claim 1 further characterized by the provision of second fluid flow restriction means to moderately damp the movement of the valve spool as it moves away from the nominal design operating position in either direction.

3. A pressure control valve comprising in combination:

a valve body having an inlet and outlet, a chamber filled with hydraulic fluid, and a passageway one end of which is in communication with the chamber, the passageway permitting hydraulic fluid to flow into and out of the chamber;

a valve spool mounted with the valve body and shiftable against biasing means from a normal closed position through a nominal design operating position to a full open position, the inlet being placed in communication with the outlet as the valve spool attains the nominal design operating position;

first fluid flow restriction means to greatly damp the movement of the valve spool and which becomes operational only as the valve spool attains the nominal design operating position; and second fluid flow restriction means to moderately damp the movement of the valve spool as it moves away from the nominal design operating position in either direction, the second fluid flow restriction means being an annular orifice defined between the periphery of an enlarged portion of the valve spool and the cylindrical surface of the chamber.

4. The pressure control valve set forth in claim 3 wherein the first fluid flow restriction means is formed by the cooperation of the enlarged portion of the valve spool and the surface of the chamber immediately surrounding said passageway.

* * * * *